(12) United States Patent
Lewis et al.

(10) Patent No.: US 8,489,730 B2
(45) Date of Patent: Jul. 16, 2013

(54) SERVER LOCATION MAPPING

(75) Inventors: Andrew J. Lewis, Litchfield, NH (US); Kenny C. Gross, San Diego, CA (US); Aleksey M. Urmanov, San Diego, CA (US)

(73) Assignee: Oracle America, Inc., Redwood Shores, CA (US)

(*) Notice: Subject to any disclaimer, the term of this patent is extended or adjusted under 35 U.S.C. 154(b) by 892 days.

(21) Appl. No.: 12/177,729

(22) Filed: Jul. 22, 2008

(65) Prior Publication Data

US 2010/0023614 A1   Jan. 28, 2010

(51) Int. Cl.
 *G06F 15/173* (2006.01)
(52) U.S. Cl.
 USPC .......................................... 709/224; 702/150
(58) Field of Classification Search
 USPC ............ 709/224, 223, 200; 340/572.1, 539.1, 340/539.12, 825.36, 825.49; 702/150, 159, 702/185
 See application file for complete search history.

(56) References Cited

U.S. PATENT DOCUMENTS

| 7,010,445 B2* | 3/2006 | Battenberg et al. ............. 702/77 |
| 7,191,090 B1* | 3/2007 | Cunningham ................. 702/150 |
| 7,642,914 B2* | 1/2010 | Campbell et al. .......... 340/572.1 |
| 7,707,890 B2* | 5/2010 | Popescu et al. ................. 73/660 |
| 2003/0009302 A1* | 1/2003 | Leslie ............................ 702/65 |
| 2003/0097422 A1* | 5/2003 | Richards et al. .............. 709/217 |
| 2006/0259793 A1* | 11/2006 | Moore et al. .................. 713/300 |
| 2008/0105056 A1* | 5/2008 | Popescu et al. ................. 73/649 |

\* cited by examiner

*Primary Examiner* — Ruolei Zong
(74) *Attorney, Agent, or Firm* — Park, Vaughan, Fleming & Dowler, LLP; Steven E. Stupp

(57) ABSTRACT

Embodiments of a method for determining locations of computers in a group of computers, which may be performed by a system, are described. During operation, the system receives a location of a first computer in the group of computers. Then, the system determines locations of one or more additional computers in the group of computers relative to the first computer based on vibration spectra associated with the first computer and the one or more additional computers.

18 Claims, 5 Drawing Sheets

SERVER LOCATION MAPPING

BACKGROUND

1. Field of the Invention

The present invention generally relates to devices and techniques for monitoring a computer system. More specifically, the present invention relates to techniques for determining locations of servers in a data center based on vibration spectra.

2. Related Art

Modern data centers typically contain hundreds and even thousands of servers. Managing these servers is becoming an increasingly complicated and expensive task. For example, different servers within the same data center may be configured differently and may consequently require different software and different drivers. Moreover, servers typically consume significant amounts of power depending upon load. Consequently, the resulting thermal load and the associated cooling requirements for servers can vary dynamically, as different workloads are executed over time.

In order to address these challenges and effectively manage a data center, it is useful to be able to determine the locations of individual servers in the data center (which, for example, allows the spatial dynamic thermal load and cooling requirements to be determined). However, this seemingly mundane task is complicated by the sheer magnitude of the number of servers. For example, manually collecting and storing server locations for thousands of servers is a tedious and error-prone task. Moreover, the locations of specific servers can change over time as system operators replace, upgrade and relocate assets in a data center, which makes it even more difficult to maintain accurate server location information.

Hence, there is a need for other techniques to effectively determine the locations of servers and other assets within a data center.

SUMMARY

One embodiment of the present invention provides a method for determining locations of computers in a group of computers. During operation, the system receives a location of a first computer in the group of computers. Then, the system determines locations of one or more additional computers in the group of computers relative to the first computer based on vibration spectra associated with the first computer and the one or more additional computers.

In some embodiments, the group of computers is included in a data center. Moreover, the specified location and the one or more determined locations may include physical locations. For example, the specified location and the one or more determined locations may include rack, row and/or room information.

In some embodiments, determining the locations of the one or more additional computers involves a pattern-matching technique. For example, for a given computer in the one or more additional computers, the pattern-matching technique may analyze correlations in vibration power-spectral densities of the first computer and the given computer. Moreover, the correlations in the vibration power-spectral densities may be analyzed as a function of time. Note that the pattern-matching technique may include a normalized cross-power spectral density technique.

In some embodiments, the system provisions software, prior to deployment, for the given computer in the group of computers based on the specified location and the one or more determined locations.

In some embodiments, the system determines a power grid and/or a power phase associated with the given computer in the group of computers based on the specified location and the one or more determined locations.

In some embodiments, the system updates the determined location of the given computer in the group of computers when the given computer is relocated from an initial location to a new location.

Note that the determining of the locations of the one or more additional computers may be: repeated periodically and/or is repeated when one or more computers in the group of computers are relocated to a new location(s).

In some embodiments, determining the locations of the one or more additional computers eliminates human error in determining the locations of the group of computers.

In some embodiments, the system predicts if power consumption of a subset of the group of computers will exceed a predetermined threshold based on power-consumption measurements for the subset, the specified location and the one or more determined locations. Moreover, the system may determine a heat-transfer map for the group of computers based on power-consumption measurements for the group of computers, the specified location and the one or more determined locations. Note that the power-consumption measurements may be performed using telemetry monitors in the group of computers.

Another embodiment provides a computer-program product for use in conjunction with a computer system, which includes instructions corresponding to at least some of the aforementioned operations.

Another embodiment provides the system and/or the computer system.

BRIEF DESCRIPTION OF THE FIGURES

Note that like reference numerals refer to corresponding parts throughout the drawings.

DETAILED DESCRIPTION

Figure 1:
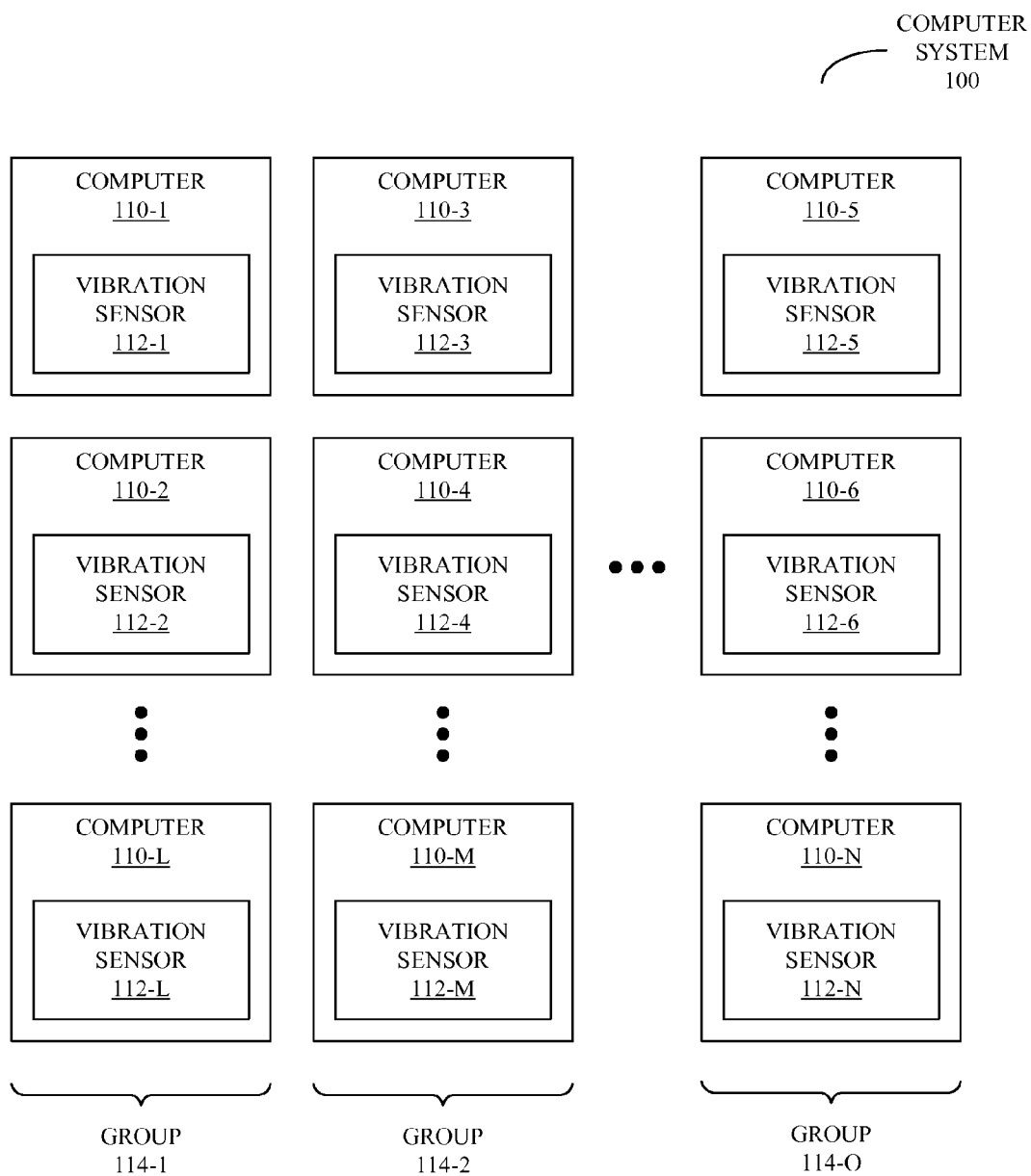
FIG. 1 is a block diagram illustrating a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system (such as a computer system), a method, and a computer-program product (i.e., software) for use with the system are described. These systems and processes may be used to perform in-situ measurements of vibration spectra for multiple computers (such as servers) in a group of computers (which may be included in the computer system). Moreover, using pairs of vibration spectra, the locations of the multiple computers may be determined relative to the known location of at least one computer in the group of computers.

In particular, the physical location (such as rack, row and/or room information in a data center) may be determined for a given computer using a pattern-matching technique. For example, the normalized cross-power spectral density may be used to analyze correlations between the vibration spectrum for the computer at the known location and the vibration spectrum of the given computer. These correlations can be very strong between computers that are mechanically coupled, such as computers in the same rack. Moreover, the correlations can be used to determine a unique and verifiable vibration 'fingerprint' for each of the multiple computers.

Using the vibration fingerprints, locations of computers in the group of computers can be determined and/or updated when the computers are moved, without operator error (for example, the locations may be automatically determined). Moreover, software can be provisioned, on a computer-specific basis, prior to deployment (for example, software for all the computers in a given rack may have the same configuration). Additionally, the computers may be associated with corresponding power grid(s) and/or power phase(s) based on the determined locations, and this information may be used to monitor/predict power consumption and/or a heat-transfer map for the group of computers.

Note that computers in the group of computers may include: servers, laptop computers, personal computers, work stations, mainframe computers, and/or a portable-computing device.

Moreover, note that the system, such as the computer system, may be at one location or may be distributed over multiple, geographically dispersed locations. Consequently, instructions and/or data associated with measurements that are executed by the system may be received and communicated within the system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a computer system that includes multiple computers. FIG. 1 presents a block diagram illustrating a computer system 100, such as a data center. This computer system includes multiple computers 110, each of which includes one or more vibration sensors 112 (such as micro-electromechanical or nano-electromechanical system accelerometers that can measure acceleration along one or more axes). Moreover, subsets of the computers 110 may be arranged in mechanically coupled groups 114, such as computers in a row, rack, and/or a room. This mechanical coupling allows the locations of the computers 110 in computer system 100 to be determined.

In particular, a vibration cross-coupling coefficient between two or more of computers 110 may be determined based on vibration spectra for the computers 110 (which may be measured using the vibration sensors 112). This vibration cross-coupling coefficient may be used as a unique vibration fingerprint for a given computer. Moreover, if the location and vibration spectra of at least one of the computers 110 (such as computer 110-1) are known, the physical locations of the other computers may be determined, with a granularity that includes rack, row and/or room information in computer system 100.

Furthermore, by repeatedly calculating the vibration cross-coupling coefficients for one or more pairs of computers in computer system 100 (for example, periodically and/or as needed), the locations of the computers 110 in the computer system 100 can be monitored and updated when computers are relocated in the computer system 100. This technique may eliminate the inherent errors that occur when humans (such as an operator of the computer system 100) try to maintain such location information.

In some embodiments, determining the locations of the computers 110 involves a pattern-matching technique. For example, for the given computer, the pattern-matching technique may analyze correlations in vibration power-spectral densities of computer 110-1 and the given computer. Moreover, the correlations in the vibration power-spectral densities may be analyzed as a function of time.

Note that the pattern-matching technique may include a normalized cross-power spectral density (NCPSD), which can be determined based on accelerometer signals from vibration sensors 112 in two or more of computers 110. NCPSD amplifies correlated signals in the frequency domain that are associated with mechanical coupling, while excluding random, incoherent variation signals that are not associated with mechanical coupling. For example, the NCPSD for two servers in the same group (such as group 114-1) in computer system 100 may have very large values at multiple frequencies, while the NCPSD for two servers in different groups (such as group 114-1 and 114-2) in computer system 100 may have strongly suppressed, near-zero values over the entire spectrum.

While NCPSD is used as an illustration, in other embodiments a variety of pattern-matching techniques, which are determined in the time and/or the frequency domain, may be used, including multivariate state estimation (MSET), which refers to a class of pattern-matching or pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern-recognition approaches. Hence, MSET as used in this specification can refer to (among other things) any technique outlined in [Gribok], including: ordinary least squares (OLS), support vector machines (SVM), artificial neural networks (ANNs), MSET, regularized MSET (RMSET), and/or a non-linear, non-parametric (NLNP) pattern-matching technique.

The ability to automatically determine the locations of computers 110 enables a variety of serviceability benefits in computer system 100. For example, software to be used in computer system 100 may be provisioned based on the physical locations of one or more of computers 110. Thus, if all of the computers in row 7, rack 3 in computer system 100 use a particular operating system or if they are all known to have a fiber drop, software for use by these computers can be provisioned (without operator intervention) to have the correct drivers and/or configuration.

Moreover, the location information allows the power grid(s) and/or power phase(s) associated with computers 110 to be determined. Typically, computers in a row in a rack have the same power phase. This is important because data center operators usually do not want more than one node in a cluster to be on the same power phase. Using the determined locations, it is now possible to ensure that computers 110 are positioned in computer system 100 according to power phase.

Furthermore, the determined locations may be used in conjunction with continuous telemetry monitoring in which optional physical sensors (which are included on circuit boards and/or integrated circuits in computers 110) are used to measure one or more physical variables (such as temperature or power consumption) and/or additional parameters (such as performance metrics) of computer system 100. For example, using real-time monitoring of power consumption and the determined locations of computers 110, 'hot spots' (in which a group of computers, such as a rack of computers, consume excessive power, such as 25% more than normal for a given power phase) may be identified and/or predicted. (Continuous telemetry monitoring is described further below with reference to FIG. 2.)

Additionally, the determined locations may be used in conjunction with continuous telemetry monitoring to determine a heat-transfer map for computer system 100 based on the power-consumption measurements. For example, the heat-transfer map may include a heating and cooling/airflow map in computer system 100 that is based on the spatial locations of computers 110 and their associated dynamic thermal load (including power consumption, processor utilization, and/or fan speeds).

In some embodiments, computer system 100 includes fewer or additional components. Moreover, two or more components may be combined into a single component and/or a position of one or more components may be changed.

Figure 2:
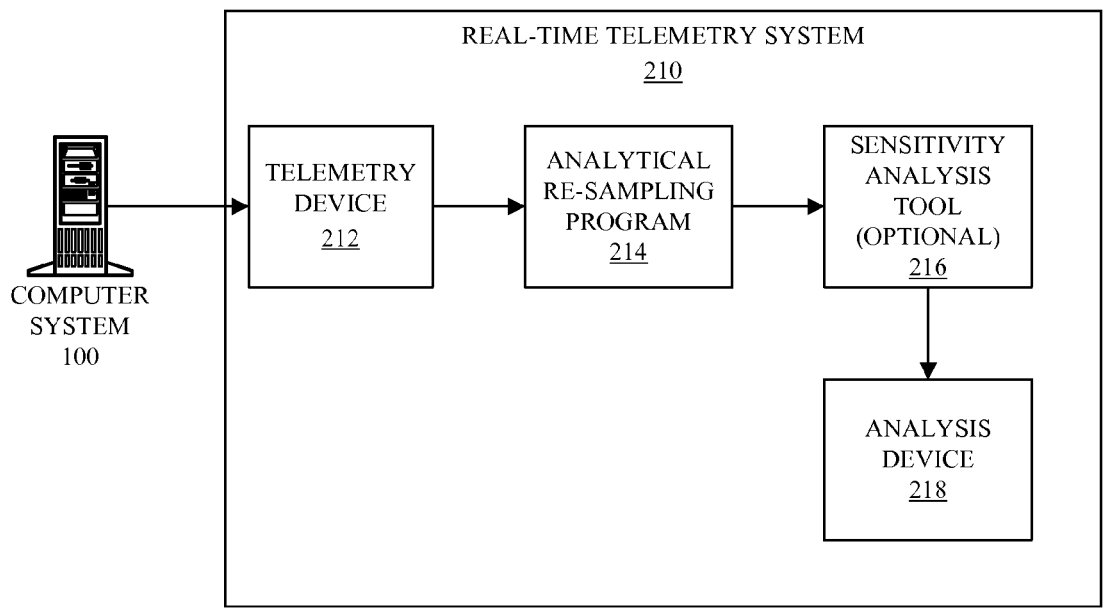
FIG. 2 is a block diagram illustrating a real-time telemetry system in accordance with an embodiment of the present invention.

We now discuss embodiments of a continuous-telemetry-monitoring system. FIG. 2 presents a block diagram of a real-time telemetry system 210 which monitors a computer system 100. This real-time telemetry system includes: telemetry device 212, analytical re-sampling program 214, optional sensitivity analysis tool 216, and/or analysis device 218 (which may use a pattern-matching technique, such as NCPSD).

Telemetry device 212 may gather information (such as vibration measurements, and more generally, telemetry signals) from various sensors and monitoring tools within computer system 100 in real-time during operation of computer system 100. In some embodiments, measurements are performed: as needed, continuously, or when driven by an event (such as an interrupt). Note that the information gathered can include telemetry signals associated with internal performance parameters maintained by software within the computer system 100. For example, these internal performance parameters can include: system throughput, transaction latencies, queue lengths, load on one or more processors or processor cores, load on the memory, load on the cache, input/output (I/O) traffic, bus saturation metrics, first-in first-out (FIFO) overflow statistics, and/or various operational profiles gathered through 'virtual sensors' located within the operating system.

Moreover, the information can include telemetry signals associated with canary performance parameters for synthetic user transactions, which are periodically generated for the purpose of measuring quality of service from the end user's perspective. Additionally, the information may include hardware or physical variables, including, but not limited to: distributed internal temperatures, environmental variables (such as relative humidity, cumulative or differential vibrations within the computer system 100, acceleration, fan speed, acoustic signals, current noise, voltage noise, and/or time-domain reflectometry readings), and/or energy consumption (such as currents and voltages).

Then, real-time telemetry system 210 directs the telemetry signals to local or remote locations that contain analytical re-sampling program 214, optional sensitivity analysis tool 216, and analysis device 218. In some embodiments, analytical re-sampling program 214, optional sensitivity analysis tool 216, and analysis device 218 are located within computer system 100. However, in other embodiments analytical re-sampling program 214, optional sensitivity analysis tool 216, and/or analysis device 218 are located on a plurality of computer systems, including computer system 100 and/or other remote computer systems.

Note that analytical re-sampling program 214 ensures that the telemetry signals have a uniform sampling rate. In doing so, analytical re-sampling program 214 may use interpolation techniques, if necessary, to fill in missing data points, or to equalize the sampling intervals when the raw data is non-uniformly sampled.

After the telemetry signals pass through analytical re-sampling program 214, they may be temporally aligned and correlated by optional sensitivity analysis tool 216. For example, in some embodiments sensitivity analysis tool 216 uses a moving temporal window technique that 'slides' through the telemetry signals with systematically varying window widths. These sliding windows systematically vary the alignment between temporal windows for different telemetry signals to optimize the degree of association between the telemetry signals, which may be quantified by an 'F-statistic' that is computed and ranked for all telemetry signal windows by optional sensitivity analysis tool 216.

Note that F-statistics reveal the measure of association or regression (such as the association between two vibration signals). In particular, the higher the value of the F-statistic, the better the correlation between two vibration signals (and more generally, between two telemetry signals). In some embodiments, the lead/lag value for the sliding window that results in the F-statistic with the highest value is chosen, and the vibration signals are aligned to maximize this value. This process may be repeated for vibration signals for each of the computers 110 (FIG. 1) and the vibration signal for computer 110-1 (FIG. 1) using optional sensitivity analysis tool 216.

Then, analysis device 218 may determine the NCPSD (or more generally, a vibration fingerprint based on a pattern-matching technique) using vibration spectra (or equivalently, vibration signals) for two or more of computers 110 (FIG. 1), which provides the vibration fingerprints and, thus, the locations of the computers 110 (FIG. 1) in computer system 100. Note that the locations may be determined during a training (or testing) mode and/or in real time as the telemetry signals are collected. For example, vibration measurements may be performed while a sequence of operations (such as a load script) is executed in computer system 100. Then, the vibration measurements, as well as other telemetry signals, are received. Next, pattern-matching analysis is performed on the received signals (in either the time domain and/or the frequency domain).

In some embodiments, real-time telemetry system 210 includes fewer or additional components. Moreover, two or more components may be combined into a single component and/or a position of one or more components may be changed.

Figure 3:
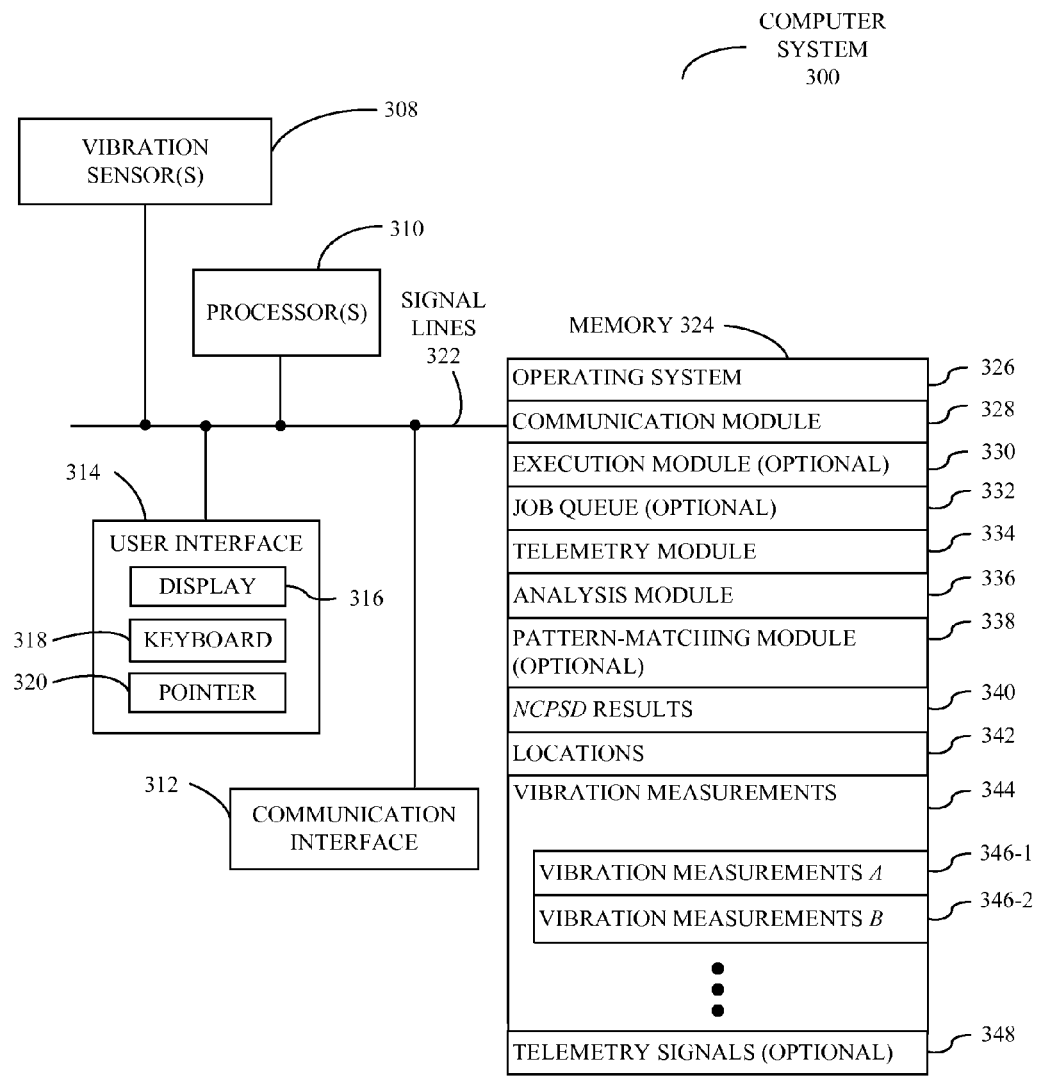
FIG. 3 is a block diagram illustrating a computer system in accordance with an embodiment of the present invention.

FIG. 3 presents a block diagram illustrating a computer system 300, such as the computer system 100 (FIGS. 1 and 2). Computer system 300 includes: one or more vibration sensors 308, one or more processors (or processor cores) 310, a communication interface 312, a user interface 314, and one or more signal lines 322 coupling these components together. Note that the one or more processors (or processor cores) 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Moreover, memory 324 may also store communication procedures (or a set of instructions) in a communication module 328. These communication procedures may be used for communicating with one or more computers, devices and/or servers, including computers, devices and/or servers that are remotely located with respect to the computer system 300.

Memory 324 may also include one or more program modules (or a set of instructions), including: optional execution module 330 (or a set of instructions), telemetry module 334 (or a set of instructions), analysis module 336 (or a set of instructions), and/or optional pattern-matching module 338 (or a set of instructions). During operation of the computer system 300, telemetry module 334 may perform telemetry measurements. For example, telemetry module 334 may perform vibration measurements 344, such as vibration measurements A 346-1 or vibration measurements B 346-2, associated with the one or more vibration sensors 308.

In some embodiments, optional execution module 330 performs one or more processes, such as one or more of the jobs in optional job queue 332, either before and/or during the vibration measurements 344. In this way, vibration measurements associated with a normal operation of computer system 300 may be determined.

After the vibration measurements 344 are received, analysis module 336 may analyze the vibration measurements 344 to determine vibration fingerprints for components in computer system 300, such as multiple servers (not shown), and thus, to determine the locations of these components relative to a known location (such as the location of at least one of the servers). For example, analysis module 336 may use optional pattern-matching module 338 to determine NCPSD results 340 and locations 342. Note that analysis module 336 may perform such analysis during a training mode (e.g., previously) or during a monitoring mode (e.g., in real time while computer system 300 is operating).

In some embodiments, telemetry module 334 receives optional telemetry signals 348 for one or more physical variables which are collected by one or more physical sensors (such as optional physical sensors in computer system 300), which may be disposed on one or more integrated circuits (such as processors 310) in computer system 300. Moreover, analysis module 336 may determine one or more optional inferential models for the one or more physical variables using the determined locations 342 and the optional telemetry signals 348. The one or more optional inferential models may be used to determine estimated values of the one or more physical variables, such as local power consumption for a group of servers or a heat-transfer map in computer system 300. By comparing the estimated values with recent measurements of the one or more physical variables, analysis module 336 may determine a condition, such as when one or more servers is likely to exceed the estimated power consumption (i.e., is likely to become a hot spot).

Instructions in the various modules in the memory 324 may be implemented in: a high-level procedural language, an object-oriented programming language, and/or in an assembly or machine language. The programming language may be compiled or interpreted, i.e., configurable or configured, to be executed by the one or more processors (or processor cores) 310.

Although the computer system 300 is illustrated as having a number of discrete components, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component and/or a position of one or more components may be changed. In some embodiments the functionality of computer system 300 may be implemented more in hardware and less in software, or less in hardware and more in software, as is known in the art.

Figure 4:
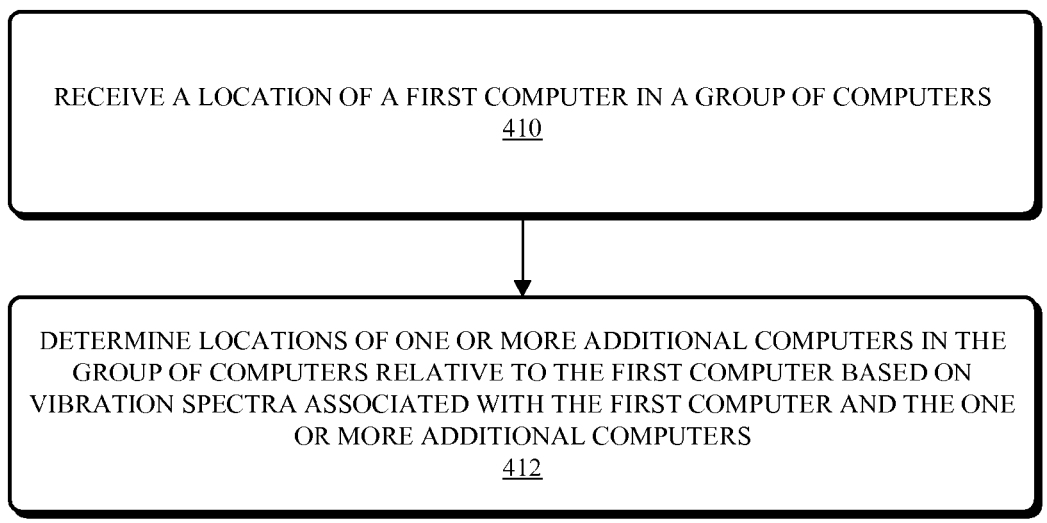
FIG. 4 is a flowchart illustrating a process for determining locations of computers in a group of computers in accordance with an embodiment of the present invention.

We now discuss embodiments of methods for determining locations of computers in a group of computers. FIG. 4 presents a flowchart illustrating a process 400 for determining locations of computers in a group of computers, which may be performed by a system. During operation, the system receives a location of a first computer in the group of computers (410). For example, the rack and/or row position of the first computer in the group of computers may be manually specified by an operator of a computer system (such as a data center). Then, the system determines locations of one or more additional computers in the group of computers relative to the first computer based on vibration spectra associated with the first computer and the one or more additional computers (412).

In some embodiments of process 400 there may be additional or fewer operations. Moreover, the order of the operations may be changed and/or two or more operations may be combined into a single operation. Additionally, the preceding operations may be implemented using hardware and/or software, as is known in the art.

Figure 5:
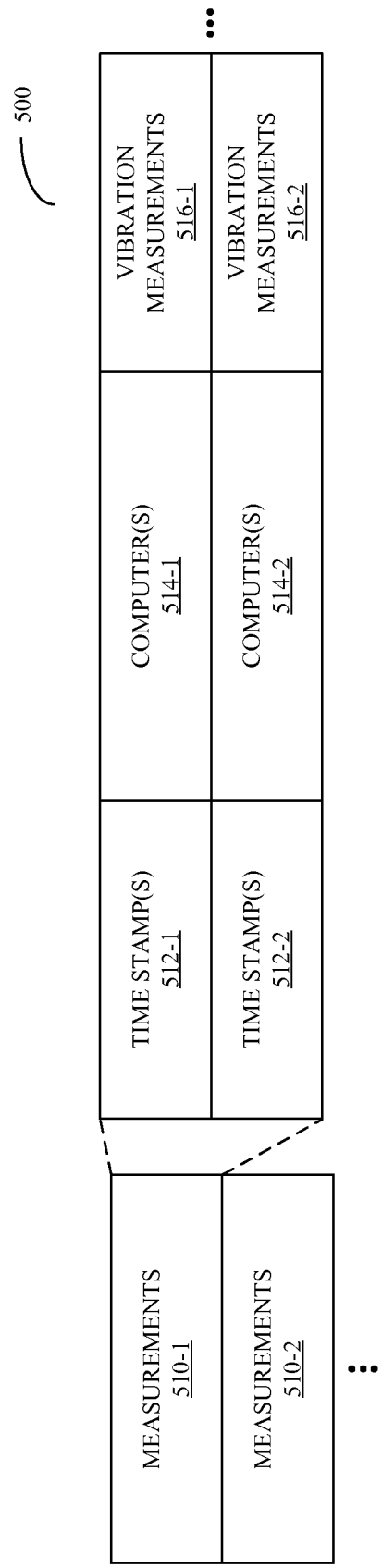
FIG. 5 is a block diagram illustrating an embodiment of a data structure in accordance with an embodiment of the present invention.

We now describe data structures for use in computer system 100 (FIG. 1) and 300 (FIG. 3). FIG. 5 presents a block diagram illustrating an embodiment of a data structure 500. This data structure may include measurements 510. More specifically, a given instance of the measurements 510, such as measurements 510-1, may include multiple entries for: one or more time stamp(s) 512, one or more computers 514, and/or one or more received vibration measurements 516.

Note that that in some embodiments of the data structure 500 there may be fewer or additional components. Moreover, two or more components may be combined into a single component and/or a position of one or more components may be changed.

While vibration signals have been used in the preceding discussion as an illustration, in other embodiments signals corresponding to other physical phenomena between mechanically coupled computers may be used to determine the locations of these computers in computer systems, such as data centers.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining locations of computers in a group of computers, comprising:
specifying a location of a first computer in the group of computers; and
determining locations of one or more additional computers in the group of computers relative to the first computer using a vibration spectrum for the first computer and a vibration spectrum for each of the one or more additional computers, wherein the first computer is mechanically coupled to the one or more additional computers, and wherein using the vibration spectrum for the first computer and the vibration spectrum for each of the one or more additional computers comprises, for each of the one or more additional computers, using a pattern-matching technique to analyze correlations in vibration power-spectral densities of the first computer and the each of the one or more additional computers.

2. The method of claim 1, wherein the group of computers is included in a data center.

3. The method of claim 2, wherein the specified location and the one or more determined locations include rack, row or room information.

4. The method of claim 2, wherein the specified location and the one or more determined locations include physical locations.

5. The method of claim 1, wherein the correlations in the vibration power-spectral densities are analyzed as a function of time.

6. The method of claim 1, wherein the pattern-matching technique includes a normalized cross-power spectral density.

7. The method of claim 1, further comprising performing computer-specific provisioning, prior to deployment, of software for a given computer in the group of computers based on the specified location and the one or more determined locations.

8. The method of claim 1, further comprising determining a power grid associated with a given computer in the group of computers based on the specified location and the one or more determined locations.

9. The method of claim 1, further comprising determining a power phase associated with a given computer in the group of computers based on the specified location and the one or more determined locations.

10. The method of claim 1, further comprising updating the determined location of a given computer in the group of computers when the given computer is relocated from an initial location to a new location.

11. The method of claim 1, wherein the determining is repeated periodically.

12. The method of claim 1, wherein the determining is repeated when one or more computers in the group of computers are relocated from initial location(s) to a new location(s).

13. The method of claim 1, wherein determining the locations of the one or more additional computers eliminates human error in determining the locations of the group of computers.

14. The method of claim 1, further comprising predicting if power consumption of a subset of the group of computers will exceed a predetermined threshold based on power-consumption measurements for the subset, the specified location and the one or more determined locations.

15. The method of claim 1, further comprising determining a heat-transfer map for the group of computers based on power-consumption measurements for the group of computers, the specified location and the one or more determined locations.

16. The method of claim 15, wherein the power-consumption measurements are performed using telemetry monitors in the group of computers.

17. A computer-program product for use in conjunction with a computer system, the computer-program product comprising a non-transitory computer-readable storage medium and a computer-program mechanism embedded therein for configuring the computer system, the computer-program mechanism including:
instructions for receiving a location of a first computer in a group of computers; and
instructions for determining locations of one or more additional computers in the group of computers relative to the first computer using a vibration spectrum for the first computer and a vibration spectrum for each of the one or more additional computers, wherein the first computer is mechanically coupled to the one or more additional computers, and wherein using the vibration spectrum for the first computer and the vibration spectrum for each of the one or more additional computers comprises, for each of the one or more additional computers, using a pattern-matching technique to analyze correlations in vibration power-spectral densities of the first computer and the each of the one or more additional computers.

18. A computer system, comprising:
a processor;
memory;
a program module, wherein the program module is stored in the memory and configured to be executed by the processor, the program module including:
instructions for receiving a location of a first computer in the group of computers; and
instructions for determining locations of one or more additional computers in the group of computers relative to the first computer using a vibration spectrum for the first computer and a vibration spectrum for each of the one or more additional computers, wherein the first computer is mechanically coupled to the one or more additional computers, and wherein using the vibration spectrum for the first computer and the vibration spectrum for each of the one or more additional computers comprises, for each of the one or more additional computers, using a pattern-matching technique to analyze correlations in vibration power-spectral densities of the first computer and the each of the one or more additional computers.

* * * * *